UNITED STATES PATENT OFFICE.

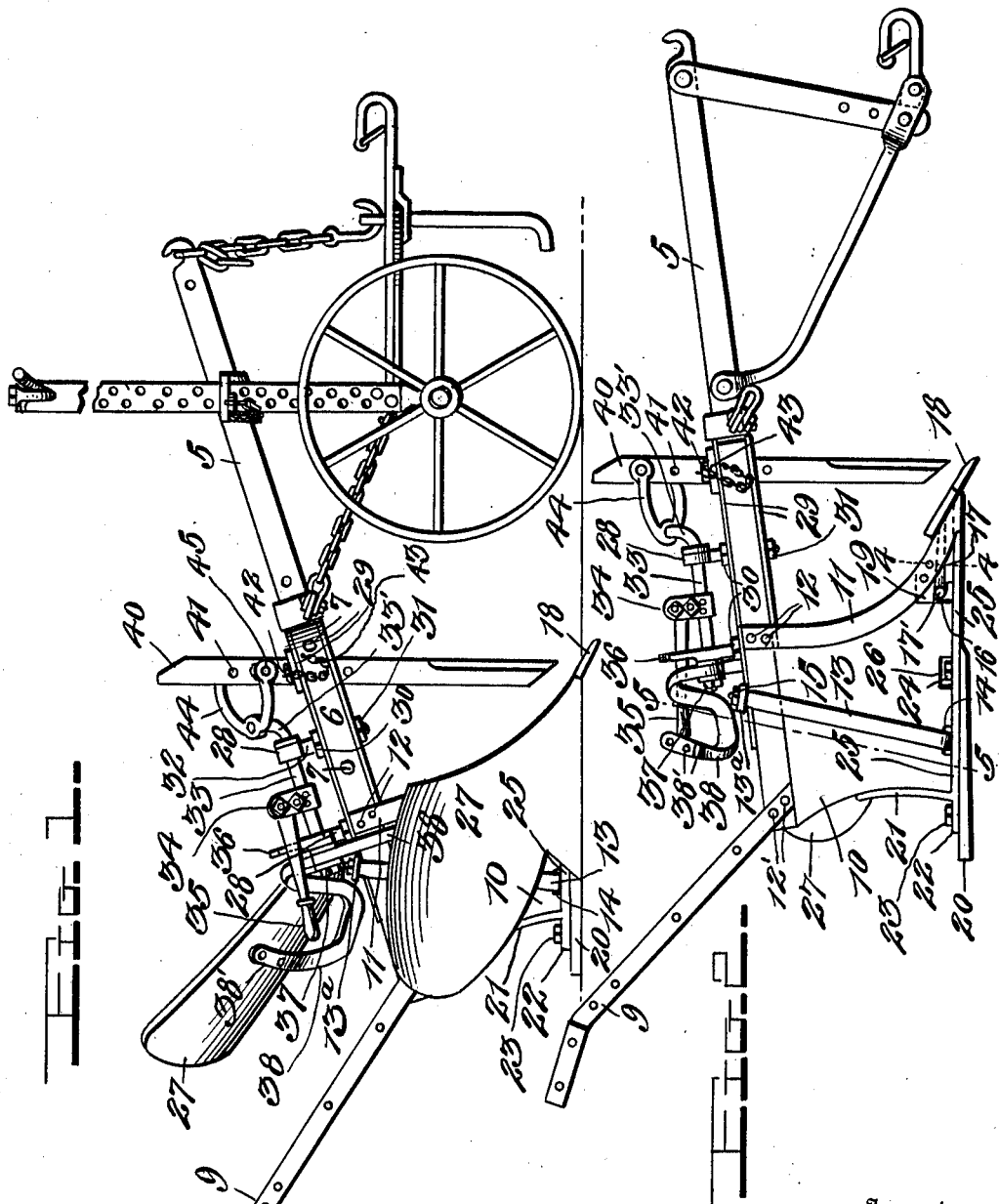

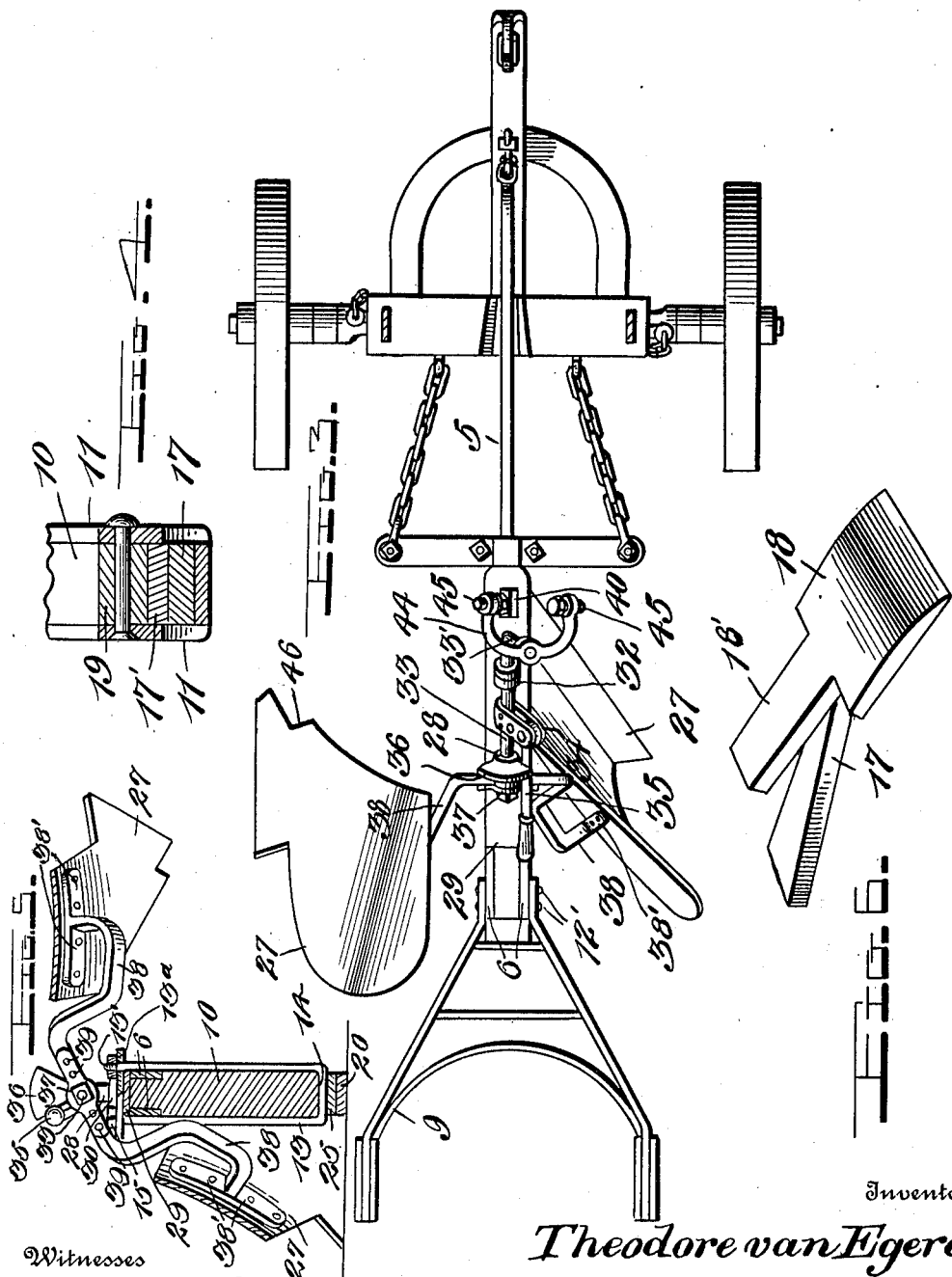

THEODORE VAN EGEREN, OF GLENBURNIE, MARYLAND.

PLOW.

1,021,117.   Specification of Letters Patent.   Patented Mar. 26, 1912.

Application filed March 29, 1911. Serial No. 617,613.

*To all whom it may concern:*

Be it known that I, THEODORE VAN EGEREN, a citizen of the United States, residing at Glenburnie, in the county of Anne Arundel and State of Maryland, have invented certain new and useful Improvements in Plows, of which the following is a specification, reference being had to the accompanying drawings.

This invention relates to plows and has for its object to provide a land breaking plow of simple and novel construction whereby the earth may be turned from the furrow to either the right or left of the plow beam.

A further object of the invention is to provide a plow comprising a beam having a plow point rigidly fixed thereto, and a pair of mold boards movably mounted upon the beam and disposed on opposite sides thereof adapted to be singly arranged in operative relation to the plow point, and means for maintaining the mold boards in such position.

Another object of the invention is to provide removable supporting wheels for the forward end of the plow beam, and means for adjustably mounting the beam thereon to regulate the depth to which the plow point enters the ground.

A still further object of the invention is to provide a supporting beam and means for rigidly mounting a plow point thereon, movable mold boards mounted on the beam, means for manually positioning the mold boards separately in operative position, and a cutter bar movably mounted in the beam having its lower end disposed in line with the plow point, and means actuated by said last named means to dispose the lower end of said cutter bar at the edge of the furrow.

With the above and other objects in view, the invention consists of the novel features of construction, combination and arrangement of parts hereinafter fully described and claimed, and illustrated in the accompanying drawings, in which—

Figure 1 is a side elevation of a plow embodying my improvements showing the beam and supporting wheels in position; Fig. 2 is a similar view, the supporting wheels and one of the mold boards being removed; Fig. 3 is a top plan view, the forward end of the beam being broken away; Fig. 4 is a section taken on the line 4—4 of Fig. 2; Fig. 5 is a section taken on the line 5—5 of Fig. 2; Fig. 6 is a detail perspective view of the stationary plow point.

Referring in detail to the drawings 5 designates a beam which consists of the two parallel bars 6 spaced apart at their rear ends and rigidly secured together at their forward ends by means of a plurality of bolts or rivets 7. To the rear ends of these parallel bars, the diverging handle bars 9 are rigidly secured. The upper end of a body member 10, preferably of wood is arranged between the spaced bars 6, and to the forward edge of this body member on opposite sides thereof the metal straps 11 are securely riveted, the upper ends of said straps extending upon the outer faces of the bars 6 and being riveted thereto as shown at 12. The rivets 12′ will secure the handle bars 9 to the beam and also extend through the body member 10. As a further means of security for this body member, a metal strap bar 13 is vertically disposed on opposite sides of the body 10, the intermediate portion of said bar being positioned in a recess 14 in the lower edge of the member 10. The ends of this bar are reduced and threaded and extend above the beam. Upon the same a clip plate 13$^a$ is arranged, suitable nuts 15 being threaded on the ends of said bar. The forward edge of the member 10 is curved as clearly shown in Fig. 2 and at the lower edge thereof said member is cut away or longitudinally recessed as at 16 to receive an arm 17 which is rigidly secured at one end to the plow point 18. The other end of the plate 17 is secured by means of a key 17′ within the recess 16. A block 19 is riveted to the straps 11 at their lower ends between which said block is disposed. The plate 17 it will be noted from reference to Fig. 6 is gradually flared longitudinally, or in other words, is of greater width at one end than at the other. The wider end of this attaching plate is located in the rear end of the recess 16. It will thus be seen that in the event that the attaching screw should become loose, the plow point will still retain its proper position on the forward end of the body member 10, the pressure thereon being exerted upwardly and rearwardly. The plow point 18 extends below the plane of the lower edge of the body member 10.

In order to prevent wear upon the lower edge of the body member and to dispose the plow point at the proper angle, I provide an adjustable plate 20. To the rear edge of the member 10 a metal strap 21 is rigidly secured and at its lower end is rearwardly extended as indicated at 22. An adjusting bolt 23 is disposed through an opening in this rearwardly extending end of the plate 21 and has threaded engagement in the wear plate 20. A similar adjusting screw 24 is also threaded in the forward end of said wear plate. This screw is disposed through the metal edge strip 25 secured to the lower edge of the member 10 and has its head located in a recess 26 in said member. The wear plate 20 may be easily and quickly removed or renewed when necessary.

Upon the beam 5 the mold boards 27 are arranged and are adapted to be separately positioned with relation to the plow point 18 to throw the earth from the furrow to either side thereof as may be desired. To this end I arrange upon the beam 5 the spaced vertical eye bolts 28, the shanks of which are disposed between the bars 6 of the beam and extend below the same. Upon the upper and lower edges of the bars 6 the plates 29 are arranged, said bolt shanks extending through the plates. Shoulders 30 formed on the bolts engage the upper plate 29, and nuts 31 are threaded on the lower ends of said bolts and engage the lower plate, whereby said plates are securely held in position. The eyes 32 provide bearings for a short longitudinally disposed shaft 33 which is mounted therein at its ends. To this shaft between the eye bolts a U-shaped plate 34 is securely riveted, and in the ends of said plate a lever 35 is pivotally mounted. A sector-shaped plate 36 is integrally formed upon the rearmost eye bolt 28 and is vertically disposed above the same. With the opposite edges of this plate the lever 35 is adapted to engage to prevent rotative movement of the shaft 33 in its bearings and maintain either one of the mold boards 27 in its proper operative position. The rear end of the shaft 33 is squared to receive a plate 37. Each end of this plate is bifurcated to receive the end of a curved arm 38, said arms and plate being rigidly connected by means of suitable bolts or rivets 39. The other ends of the arms 38 are split as indicated at 38' and are rigidly fixed to the inner faces of the mold boards 27 by bolting or riveting the same thereto.

A bar 40 is arranged in advance of the plow and is vertically adjustable in the beam 5, said bar being provided with a plurality of openings 41 to receive a pin 42 fixed to the end of a chain 43, the other end of which is secured to the beam. This bar is adapted to cut through roots or trailing vines and to deflect large stones so as to clear the ground in front of the plow point and remove such obstructions as would tend to retard the movement of the plow and place additional draft upon the horses. This bar is loosely mounted in the beam so that it can oscillate transversely and the lower end thereof is automatically positioned in alinement with one of the longitudinal edges of the plow point opposite to the direction in which the earth is turned by the mold board. This automatic adjustment of the bar 40 is obtained by means of a U-shaped bar 44 which is rigidly fixed intermediate of its ends upon the vertically disposed forward end 33' of the shaft 33. In each end of the rod 44, a stud 45 is threaded. These studs are adapted to engage opposite sides of the vertical bar 40 to oscillate said bar in the beam and properly position its lower end with relation to the plow point. By adjusting the threaded studs 45 in the end of the bar 44, the vertical bar 40 may be rigidly held in its proper position.

As thus far described, the operation of my improved plow is substantially as follows. When the operator desires to position one of the plows for engagement in the ground, he elevates the lever 35 and moves the same transversely with relation to the beam 5, thereby rocking the shaft 33 in its bearings and swinging one of the plows downwardly upon one side of the beam and elevating the other. After the plow has been moved to its operative position, the operator moves the lever 35 rearwardly and downwardly into engagement with one of the inclined edges of the sector plate 36 so as to maintain the plow in its operative position and to prevent the gravity movement of the plow which is elevated. When it is desired to throw the earth from the furrow in the opposite direction, the operator reverses the movement of the lever 35 so as to lower the other of the plows whose mold board extends upon the opposite side of the beam. The lower forward end of the mold board is notched or recessed as indicated at 46 to fit closely against the upper end of one of the longitudinal edges of the reduced portion 18' of the plow point 18, thereby providing a smooth unbroken surface over which the earth passes on to the mold board. In this manner it will be seen that either of the plows may be easily and quickly moved to its operative position with relation to the plow point 18 whereby the earth may be turned over from the furrow in the proper direction.

From the foregoing it is believed that the construction and operation of my improved earth breaking plow will be readily understood.

While the invention is primarily adapted for the breaking or opening of new ground, it will be understood that the device is by no means limited in this regard and may be used in many other instances where a plow of the above described character would be particularly desirable. By providing the movable mold boards which co-act with the stationary plow point, both a right and a left hand plow are embodied in the one machine, thus reducing to a material extent the expense involved in providing two separate plows. As the various parts are all of simple construction, the device is extremely strong and durable. Owing to its simplicity, it will also be obvious that the plows may be readily adjusted at the will of the operator.

While I have shown and described the preferred construction and arrangement of the various parts, it will be understood that the device is susceptible of considerable modification without departing from the essential feature or sacrificing any of the advantages thereof.

Having thus described the invention what is claimed is:—

1. In a machine of the character described, the combination with a beam, of a plow point carried thereby, mold boards arranged on said beam on opposite sides of the plow point and adapted to engage closely therewith, a shaft rotatably mounted on the beam, a bar connecting the mold boards fixed to said shaft, a lever for rotating said shaft, a vertically disposed bar movably mounted in the beam having its lower end disposed adjacent to the plow point, and means carried by the shaft and adjustable with relation thereto to engage said bar in the movement of the mold boards and position its lower end with relation to the plow point.

2. In a machine of the character described, the combination with a beam, of a plow point carried thereby, mold boards arranged on said beam on opposite sides of the plow point, a shaft rotatably mounted on the beam, a bar connecting the mold boards fixed to one end of said shaft, a lever for rotating said shaft, a vertically disposed transversely oscillatory bar mounted in the beam having its lower end disposed adjacent to the plow point and adapted to be located adjacent one edge thereof in its operative position, a rod fixed to the other end of said shaft and disposed transversely of the beam, and adjustable studs mounted in the ends of said rod to engage said vertical bar and oscillate the same in the beam to position the bar with relation to the plow point.

In testimony whereof I hereunto affix my signature in the presence of two witnesses.

THEODORE van EGEREN.

Witnesses:
  GEO. S. LIVINGSTON,
  L. G. ELLIS.